May 27, 1930.  C. G. HERTZER  1,760,358
ICE CREAM DIPPER
Filed Feb. 27, 1929
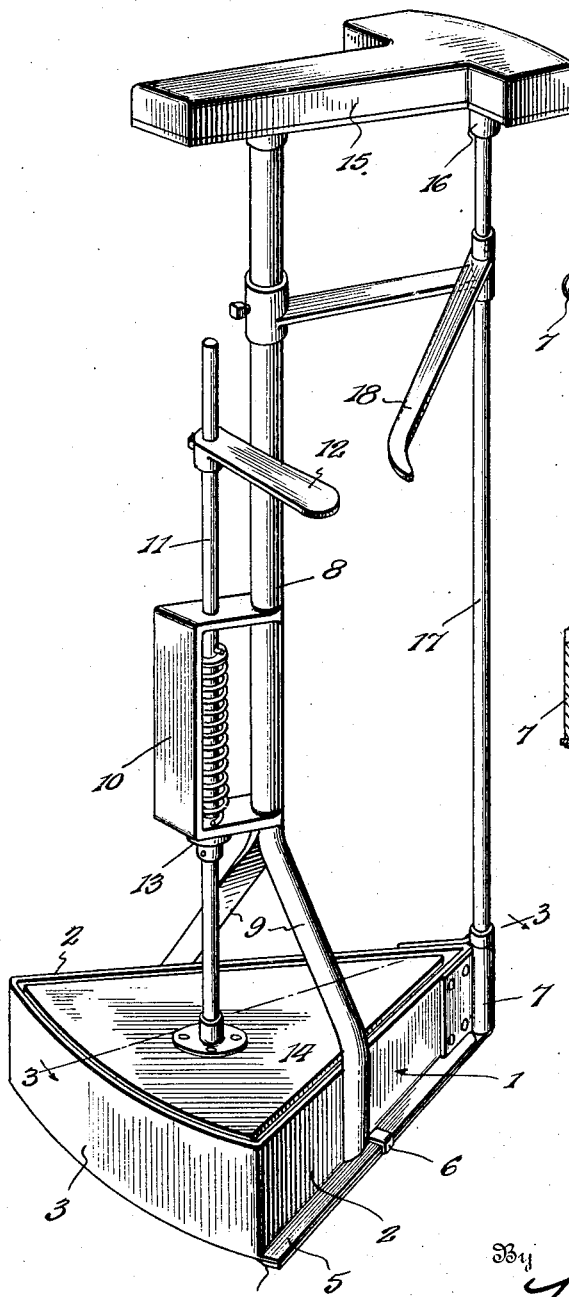
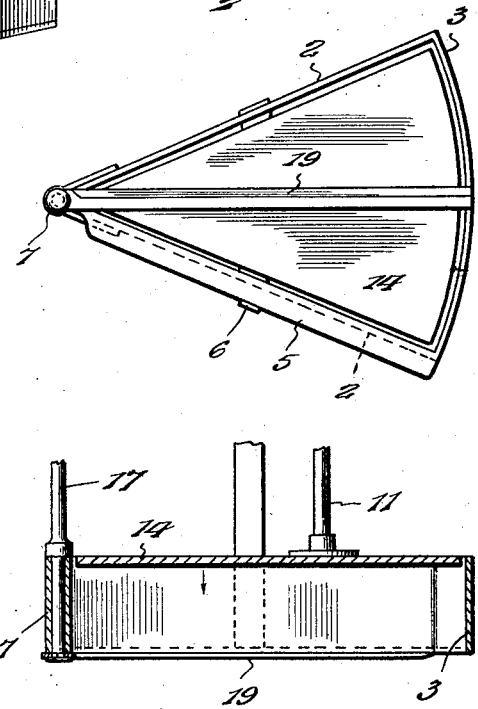
Inventor
C. G. Hertzer.
By Lacey & Lacey,
Attorneys Patented May 27, 1930

1,760,358

UNITED STATES PATENT OFFICE

CARL G. HERTZER, OF TIFFIN, OHIO

ICE-CREAM DIPPER

Application filed February 27, 1929. Serial No. 343,159.

The present invention is directed to improvements in ice cream dippers.

The primary object of the invention is to provide a device of this character which can be quickly pressed into an ice cream can or container to remove slices or slabs of bulk cream.

Another object of the invention is to provide a device of this kind having a sector-shaped mold frame in which is movable a similarly shaped plate for ejecting the slab or slice from the mold frame.

Another object of the invention is to provide a device of this kind having a cutting blade so mounted that it is capable of being swung across the bottom of the mold for severing the bulk of cream in the mold from the cream in the can or container.

Another object of the invention is to provide a novel form of cutting blade, the construction being such that during the cutting action it will be pressed upwardly for close contact with the mold frame.

With these and other objects in view, this invention resides in the novel features of construction, formation, combination and arrangement of parts to be hereinafter more fully described, claimed, and illustrated in the accompanying drawings, in which:

Figure 1 is a perspective view of the device.

Figure 2 is a bottom plan view of the mold frame.

Figure 3 is a sectional view on the line 3—3 of Figure 1.

Referring to the drawings, the numeral 1 designates the mold frame which comprises divergingly arranged side walls 2 and a curved connecting wall 3, the latter wall being curved in order that it will conform to the curvature of the can or container. One of the side walls has its lower edge terminating in a horizontally disposed flange 5 having a stop 6 carried thereby, the purpose of which will be later explained.

The meeting ends of the side walls 2 have secured thereto a bearing 7, the purpose of which will appear later.

A rod 8 is provided and has its lower end provided with arms 9 which are soldered or otherwise suitably secured to the sides 2 of the mold frame. Supported by the rod 8 is a bracket 10 in which is slidably mounted a stem 11, said stem having a handle 12 fixed thereto above the bracket 10. A coil spring encircles the stem and is engaged with the bracket and stem and serves to normally hold the handle 12 elevated or in its inoperative position. A stop 13 is fixed to the stem for engagement with the bracket to limit the upward movement thereof.

The lower end of the stem is fixed to the sector-shaped ejector plate 14, which is normally held in a plane with the upper edge of the frame 1, and acts as a top closure for the mold frame when the frame is forced into the contents of the can or container.

To the upper end of the rod 8 is fixed a hand grip 15 which carries a bearing 16 for rotatably receiving the upper end of the shaft 17, the lower end thereof being journaled in the bearing 7.

A lever 18 is fixed to the shaft 17 in order that the same can be rotated to swing the cutting blade 19 across the bottom of the mold frame. This blade has a curved under surface so that when it is swung the curved surface thereof will ride upon the bulk which tends to force the blade upwardly for snug contact with the bottom of the frame.

The swinging movement of the blade 19 is limited in one direction by the stop 6 and in another direction by the lever 18 contacting with the rod 8.

Briefly, the operation is as follows:

The shaft 17 is operated so that the blade 19 will lie under the flange 5, after which the hand grip 15 is pressed in order that the mold frame will enter the bulk cream a distance to the depth of the mold frame, thus forcing cream into the frame to take the shape thereof. Obviously the ejector plate 14 will prevent the cream from being forced through the top of the frame as the frame is forced into the bulk of cream. The lever 18 is then swung in order that the cutting blade 19 will swing across the bottom of the frame to sever the cream in the mold from the bulk in the container. The frame is now lifted and the handle 12 forced downwardly, whereupon the plate 14 will eject the cream packed in the mold frame.

From the foregoing it is thought that the construction, operation, and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Should the contents of the container or can be extremely hard an incision may be made therein with a suitable blade in order that the flange 5 and cutting blade 19 can be more easily pressed into the bulk.

Having thus described the invention, what is claimed is:

An ice cream dispenser comprising a sector-shaped molding frame having a laterally extending flange at the bottom edge of a side wall, a bearing at the converging ends of the side walls, a rod having diverging arms at its lower end attached to the side walls of the frame intermediate their ends, a shaft paralleling the rod and journaled thereto and to the said bearing, a hand grip connecting the upper ends of the rod and shaft, an operating lever attached to the shaft and limited in its movement in one direction by the said rod, a blade attached to the lower end of the shaft, a stop on the flanged side wall of the frame to normally position the blade, an ejector plate loosely fitting the frame and closing the top thereof, a stem slidably mounted on the rod and having a limited upward movement, and a spring normally holding the stem at the limit of its upward movement.

In testimony whereof I affix my signature.

CARL G. HERTZER. [L. S.]